United States Patent
Pascoe et al.

[11] Patent Number: 5,816,537
[45] Date of Patent: Oct. 6, 1998

[54] INFLATABLE KITE ARRANGEMENT AND LAUNCHER

[75] Inventors: Vernon G. Pascoe, Shere; Bernard W. Hanning, Greenford, both of United Kingdom

[73] Assignee: Skystreme UK Limited, United Kingdom

[21] Appl. No.: 481,317

[22] PCT Filed: Mar. 30, 1994

[86] PCT No.: PCT/GB94/00672

§ 371 Date: Mar. 13, 1996

§ 102(e) Date: Mar. 13, 1996

[87] PCT Pub. No.: WO94/23812

PCT Pub. Date: Oct. 27, 1994

[30] Foreign Application Priority Data

Apr. 6, 1993 [GB] United Kingdom .................... 9307184

[51] Int. Cl.[6] ........................... B64C 31/06; A63H 27/08; F41J 9/10
[52] U.S. Cl. ..................... 244/153 R; 244/155; 244/146; 244/901
[58] Field of Search ................................ 244/153 R, 901, 244/902, 146, 155 R

[56] References Cited

U.S. PATENT DOCUMENTS

| | | | |
|---|---|---|---|
| 3,860,204 | 1/1975 | Checkley | 244/153 R |
| 4,279,394 | 7/1981 | Loy | 244/153 R |
| 4,533,099 | 8/1985 | Stewart | 244/153 R |
| 4,768,739 | 9/1988 | Schnee | 244/153 R |
| 4,919,365 | 4/1990 | Mears | 244/153 R |
| 5,007,367 | 4/1991 | Matteucci et al. | 244/155 R |

FOREIGN PATENT DOCUMENTS

| | | |
|---|---|---|
| A-66087/74 | 2/1974 | Australia . |
| 2921084 | 12/1984 | Australia . |
| 0222263 | 10/1986 | European Pat. Off. . |
| 2856023 | 7/1980 | Germany . |
| 2216431 | 1/1989 | United Kingdom . |

*Primary Examiner*—Virna Lissi Mojica
*Attorney, Agent, or Firm*—Micahel D. Rechtin; Edward A. Squillante, Jr.

[57] ABSTRACT

An inflatable kite (150) that includes a plurality of longitudinal inflatable tubes (54). The kite includes transverse inflatable tube (53) at the rear end of the kite. When the kite is inflated, the front end has a larger cross-sectional area than the rear end. When inflated the rear edge and the side edges are coplanar. Air vents (57, 157) are provided. The kite may be inflated and launched manually or by an automatic launcher.

9 Claims, 4 Drawing Sheets

INFLATABLE KITE ARRANGEMENT AND LAUNCHER

The present invention relates to an inflatable kite arrangement and more particularly to a kite for use in an emergency as a location marker. In addition the invention also relates to means for and a method of launching such a kite.

In Australian Patent Application AU-A-29210/84 there is disclosed a location marking arrangement in which a kite is housed in a container with a bottle of compressed gas for inflating the kite. To deploy the kite, it is inflated by manual operation of valve means for releasing the gas in the container. The kite is six-sided with a central rectangular inflated region comprising four spaced and interconnected parallel tubes. Also the longitudinal inflatable tubes of the kite are interconnected at both ends to constitute a substantially symmetrical arrangement. This means that it may be difficult to launch the kite.

The present invention seeks to overcome or reduce this problem.

According to a first aspect of the present invention, there is provided a kite comprising a plurality of longitudinal tubes having front ends and rear ends, a transverse inflatable tube being provided at the rear ends which, when inflated, defines a rear cross-sectional area of the kite, characterised in that the front ends of the longitudinal tubes define a front cross-sectional area of the kite, which, when the kite is deployed, is larger than the rear cross-sectional area.

At least some of the longitudinal tubes are inflatable, but in preferred arrangements there is no transverse inflatable tube at the front end of the kite. Preferably, when the kite is deployed, the rear end is substantially flat and is generally co-planer with the side edges of the kite whereas the front end forms an approximately semi-circular shape in a plane generally perpendicular to the plane of the kite. Alternatively both ends of the kite may define such a semi-circular shape, with the front semi-circle being larger than the rear semi-circle.

Moreover, in the above-mentioned prior art arrangement, the degree of inflation is determined by a user, and there is a risk that this will not be effected properly; too low inflation and the kite will not function properly and may not launch at all, too high inflation and the kite may rupture.

The present invention also seeks to overcome this problem.

According to a second aspect of the present invention there is provided a device for inflating and releasing an inflatable kite according to the first aspect of the present invention, comprising a container having an inlet and an outlet for inflation gas, a piston member which can slide within the container under the effect of incoming gas, and engagement means on said piston member which is arranged to hold the inflatable member in communication with the outlet, the arrangement being such that the engagement means is disengaged from the inflatable member when the piston member has been caused to slide a predetermined distance within the container.

Preferred embodiments of the present invention will now be described, by way of example only, with reference to the accompanying drawings, of which:

Figure 1:
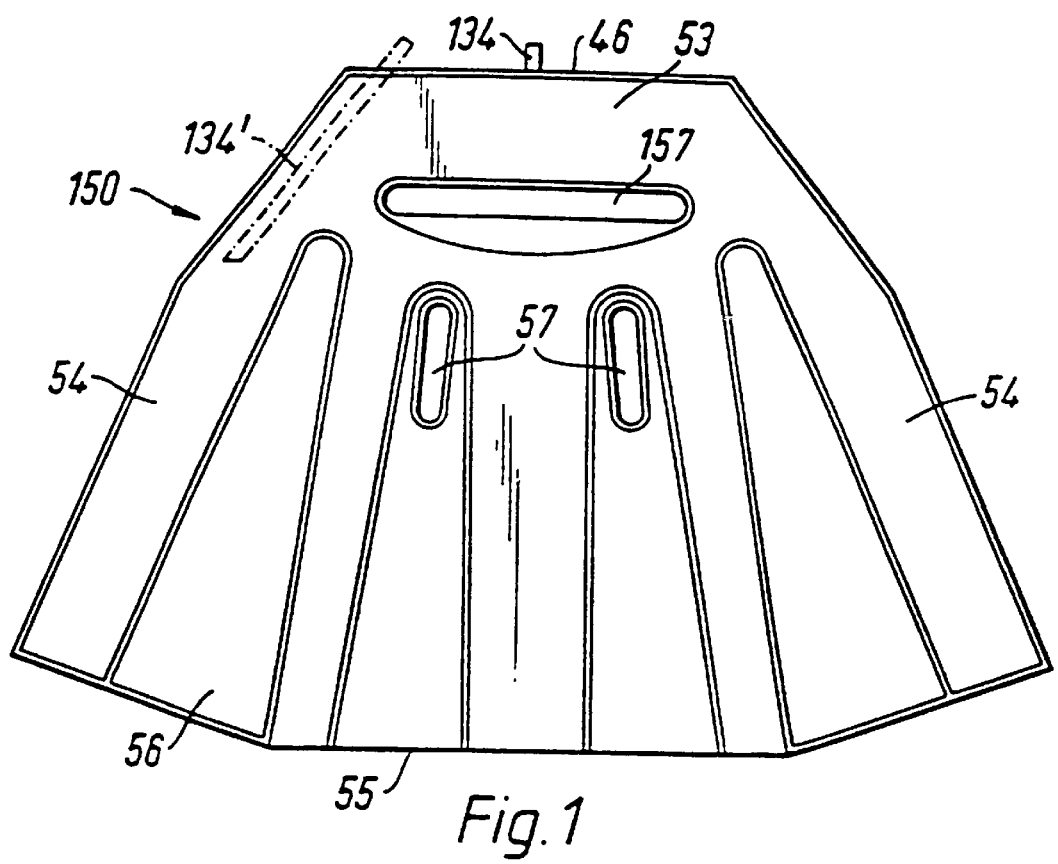
FIG. 1 shows a plan view of a kite in accordance with a first embodiment of the present invention, before inflation.

Referring to the drawings.

FIG. 1 shows the construction of a preferred kite 150, which comprises an inflated inlet manifold section 53 at a trailing end 46 which is connected to five longitudinal inflatable tubes 54 which fan out slightly to a broader end 55. Tubes 54 are of substantially constant cross-section along their length.

The kite is made of two sheets of plastics material, such as tear resistant nylon, heat-sealed together to form flat regions 56 between the inflatable tubes 54. To increase the stability of the kite in flight selected regions 56 have air vents 57, and a larger air vent 157 is provided adjacent section 53 which serves as a rudder.

The material of the kite is coated with aluminium so that it is radar-reflective and easily visible.

Figure 10:
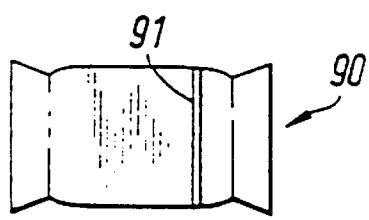
FIG. 10 shows a sealed punch for holding a kite in accordance with the first embodiment.

Before deployment the kite is carried in a sealed outer pouch 90. FIG. 10 having a designated tear point or strip 91. The pouch is manufactured from a barrier foil and hermetically sealed to ensure a long shelf life. Opening of the pouch reveals the kite and lines held together by a witness tape, which is then removed and the user subsequently inflates the kite by mouth using the external mouthpiece 134 which contains a one-way valve. As indicated in broken lines in FIG. 1, mouthpiece 134 may be replaced by a mouthpiece 134' operating with a reed valve.

Figure 2:
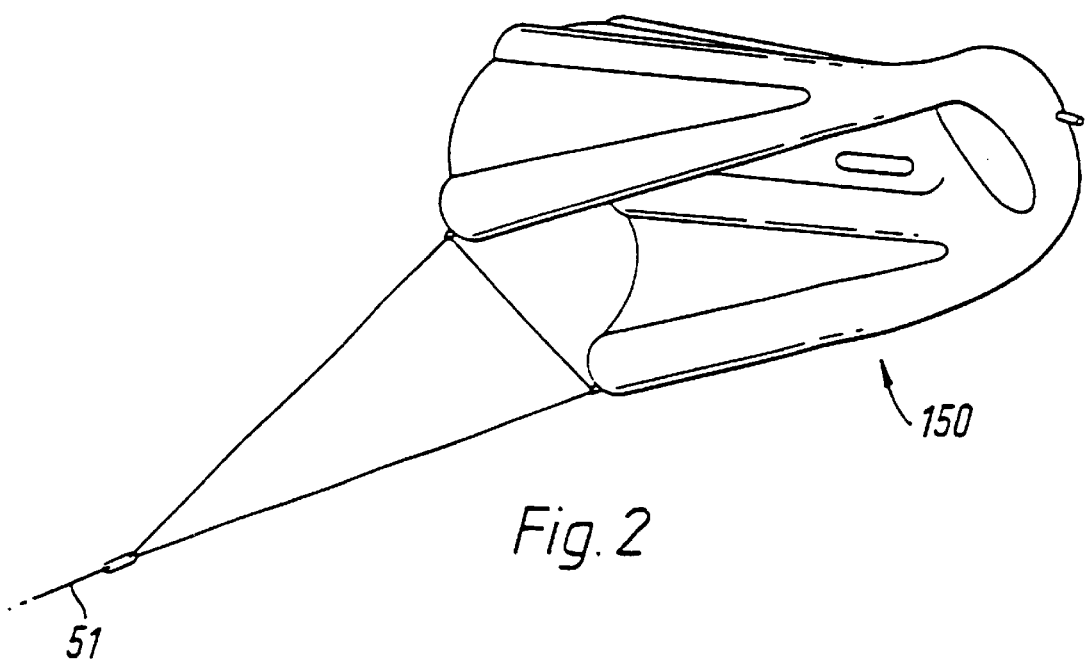
FIG. 2 shows a perspective view on a reduced scale of the kite of FIG. 1 when inflated and in flight.

The kite when inflated has the general shape shown in FIG. 2. It is arranged to be self-erecting and self-launching and flies at the end of a line 51. The rear end 46 and the side edges formed by the outer tubes 54 form a generally co-planer base of the kite, with the front end 55 forming a generally semi-circular arch.

When the free run of line is reached, the aerodynamics of the kite will take over and the kite will commence stable tethered flight. In the event of wind conditions being too light for flight the kite lands, normally in a stable, i.e. ready to take off position. When in an unstable condition, i.e. not being into wing and upright on the surface of land or water, the kite will, as the wind rises, manoeuvre itself automatically into the stable, i.e. take off position and when this position is reached the aerodynamics will again take over and flight commence without input from the user.

If conditions permit the user may simply increase the line length by using the stored line payout controller. The kite continues to fly to the full length of deployed line in wind speeds from light winds of 8 km/h up to gale force strength.

An advantage of the above kite construction is that it is easy to launch and will remain in flight even with very low winds. Even if the kite becomes grounded due to the absence of wind, it will automatically relaunch when sufficient wind returns. Moreover, it will even relaunch from water, which is most advantageous, bearing in mind that the arrangement will frequently be used at sea. When the kite is floating on water it automatically deploys with the co-planar arrangement of the rear end 46 and side edges sitting on the water. The wind enters the front end, and this correctly orientates the kite. When the front end 55 captures enough air, the rear edge tube 53 serves as a hinge and the kite takes off.

Moreover, the kite is relatively large so that it will be readily noticed even by a casual observer.

Various Modifications may be made to the above-described kite. For example, some or all of the inflatable tubes 54 may be replaced by air tubes which are inflated by the wind in flight; such a kite is less rigid, but tube 53 still provides the other advantages of the kite.

The kite 150 may incorporate a keel and/or a tail. A bridle may be provided to assist in maintaining the configuration of the leading end of the kite. The kite may carry or incorporate a radio source and/or a light.

In addition the kite 150 may be inflated and released non-manually.

Figure 3:
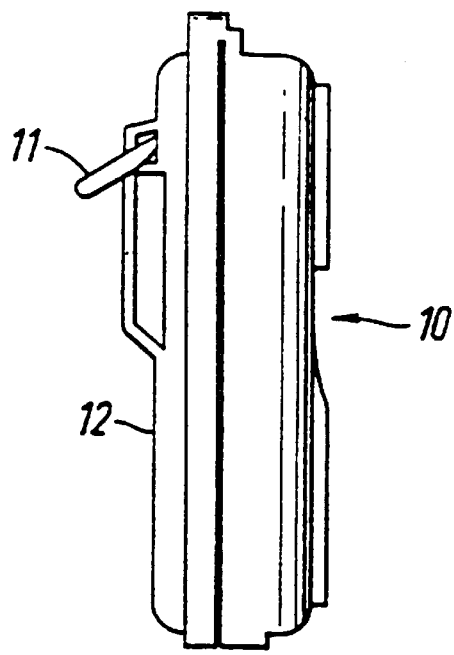
FIG. 3 shows a side view of a container for a location marker arrangement in accordance with the present invention.

For example FIG. 3 shows an automatic arrangement for launching an alternative a kite 50 in particular a pocket-sized container 10 made of lightweight, high impact resistant, water and corrosion resistant plastics material with ergonomically positioned nonslip grip areas. Container 10 may also incorporate a whistle and/or a heliograph (not shown).

To deploy the kite 50, a simple single lever action on a handle 11 breaks a "witness" or security tape (not shown) around container 10 and automatically ejects the top cover 12 to reveal the contents of the container. In particular the kite deployment handle 15, FIG. 4, is now in view.

Figure 4:
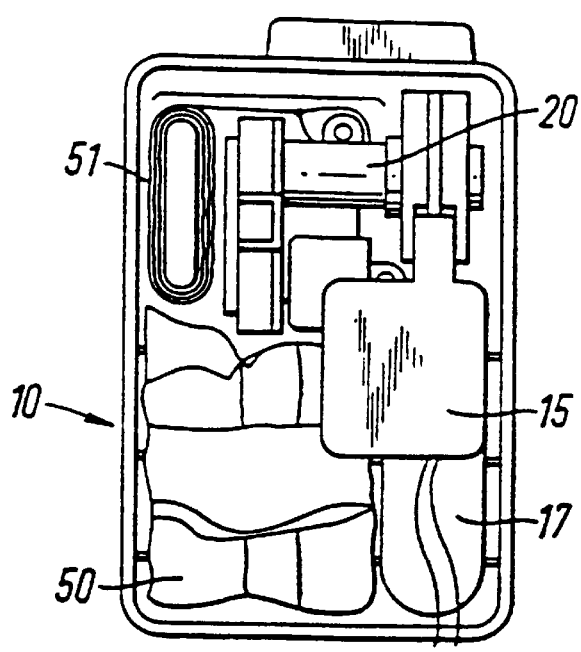
FIG. 4 is a front view of the contents of the container of FIG. 3.

As shown in FIG. 4, the container houses a folded kite 50 with a line 51, an inflation and release device 20 for the kite, and a carbon dioxide gas cartridge 17.

To operate the arrangement for deploying kite 50 a pull on handle 15 causes cartridge 17 to be pierced by a metal spike (not shown) and to release carbon dioxide to start inflation of the kite.

Figure 5:
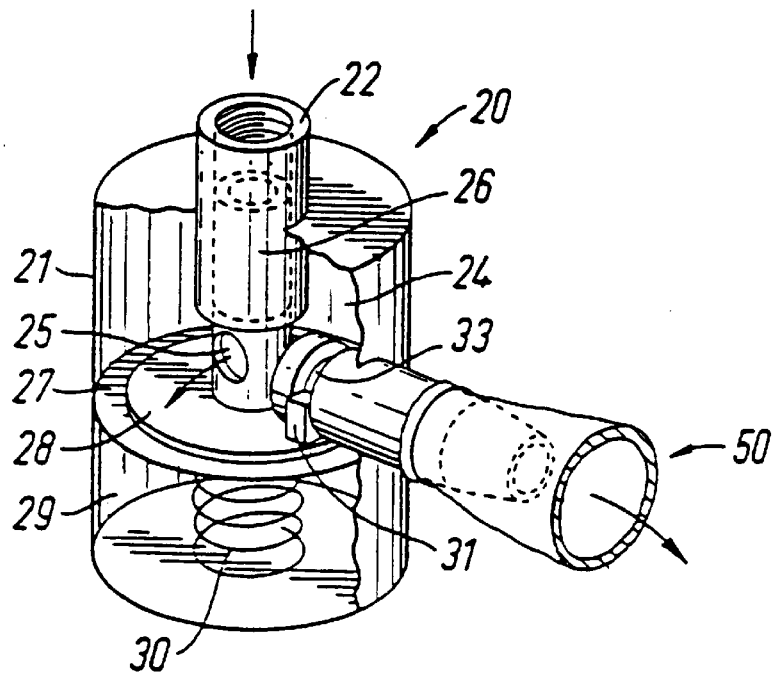
FIG. 5 is a perspective schematic and enlarged view of an inflation and release device for a kite in accordance with the present invention, before release.
Figure 6:
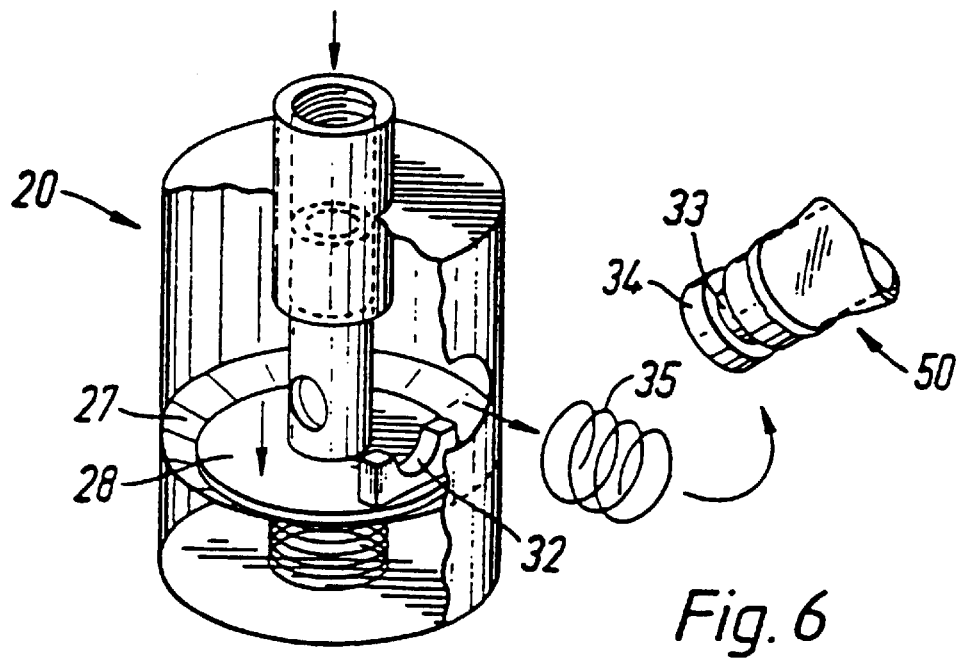
FIG. 6 is a view corresponding to FIG. 5, just after release.

The inflation and release of kite 50 are controlled by device 20 which is illustrated in greater detail in FIGS. 5 and 6. The device comprises a generally cylindrical housing 21 having an end inlet tube 22 for receiving carbon dioxide from the pierced cartridge 17 via an intervening valve (not shown).

A piston member comprising an annular diaphragm member 27 sealingly secured to a central plate 28 divides the interior of the housing 21 into a first chamber 24 and a second chamber 29. The diaphragm and plate are arranged to be axially movable within the housing. Fixed to the central region of plate 28 is a hollow tube 26 which slides within fixed inlet tube 22. Carbon dioxide enters the first chamber via openings 25 in tube 26.

The plate 28 is biassed upwardly in FIG. 5 by one end of a coil spring 30, the other end of which engages the bottom of housing 21. Projecting from the upper surface of plate 28 is an engagement piece 31 having a substantially semi-circular recess 32, see FIG. 6.

The edges of recess 32 engage in a groove 33 in an inflation mouthpiece 34 of kite 50. A coil spring 35, FIG. 6, is held compressed between tube 26 and mouthpiece 34. Mouthpiece 34 incorporates a conventional self-sealing valve 36, FIG. 7.

In operation inflation gas passes through the first chamber 24 into the inflatable parts of the kite 50 via mouthpiece 34. As pressure builds up in chamber 34, the diaphragm 27 and plate 28 move downwardly against the force of spring 30. When the desired release pressure is achieved, projection 31 disengages from groove 33. This releases the kite 50 which is then ejected by spring 35, see FIG. 6. Initially a short length of line 51 is released, and the tension in the line then unspools the remaining line in a controlled manner from a paying-out device (not shown) until the kite reaches its full height.

The above-described inflation and release device has numerous advantages. A single pull on handle 11 followed by a pull on handle 15 is all that is required to launch the kite. Both these operations can be performed with one hand and require minimum effort and skill on the part of the user. The construction of the diaphragm and its mechanical engagement with the kite mouthpiece ensures that the kite can only be released when sufficient pressure has been achieved but prevents excess pressure building up.

In a modification of the above-described arrangement, stop means may be provided to prevent downward movement of the diaphragm until container 10 has been opened. In other modifications handle 15 may be replaced by a pull cord or it may be arranged for a single pull on one handle to open the container 10 and to initiate launch of the kite.

Figure 7:
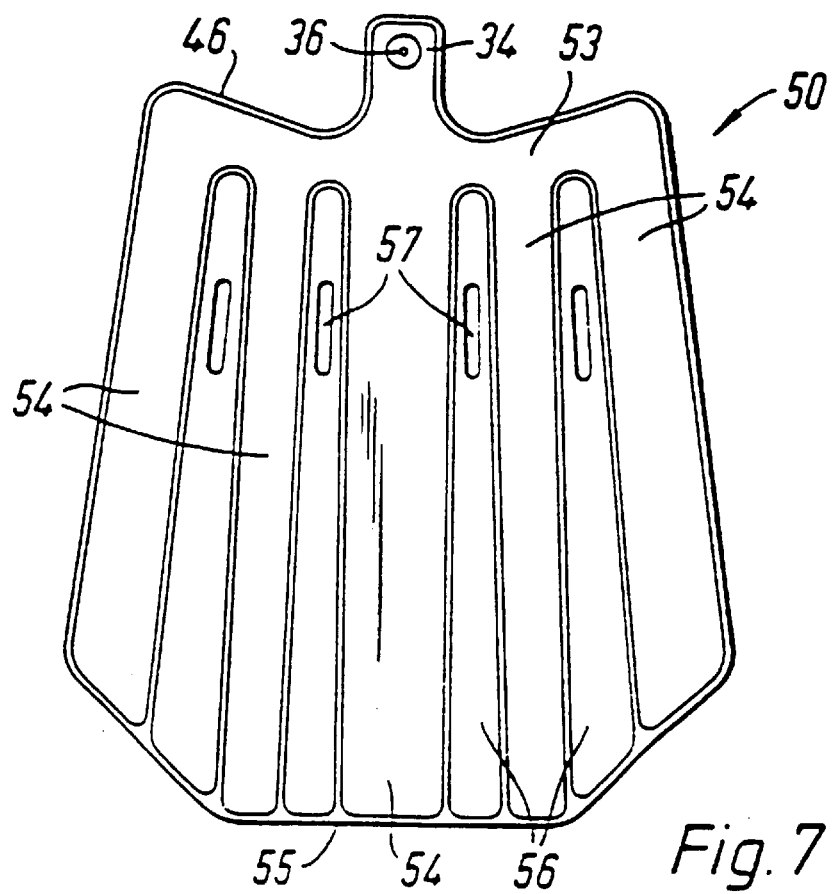
FIG. 7 is a top perspective view of a kite in accordance with a second embodiment of the present invention laid flat.
Figure 8:
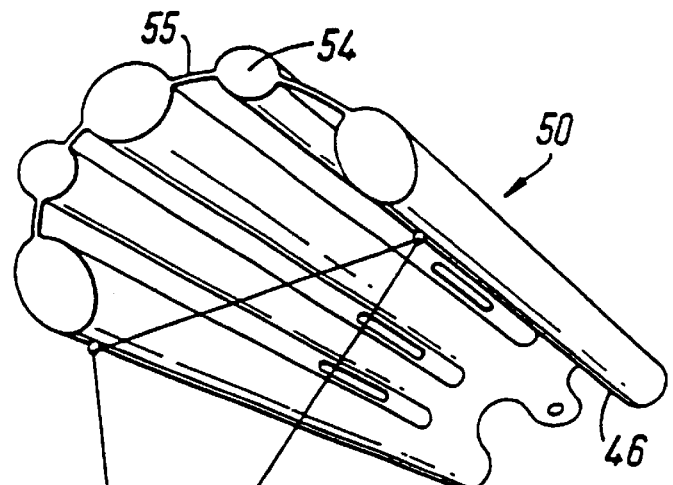
FIG. 8 is a perspective underside view of the kite of FIG. 7 in its deployed and inflated condition.
Figure 9:
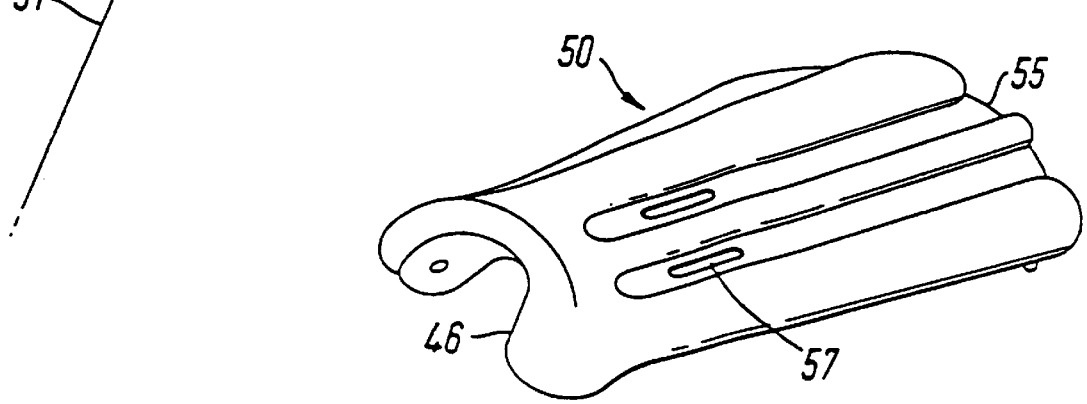
FIG. 9 is a rear perspective view of the deployed kite of FIGS. 7 and 8.

Turning now to FIGS. 7 to 9, the construction of the alternative kite 50 will now be described. However, it will be appreciated that the inflation and release device 20 is capable of operating with a wide range of other kites and balloons in addition to kites 150 and 50.

Kite 50 has numerous similarities to kite 150. However, when it is flat and not inflated, end 46 is generally concave and end 55 is generally convex as shown in FIG. 7. It has air vents 57 but, preferably, no rear air vent 157.

The tube 53 forming the inlet section is constructed so that upon inflation it forms a substantially semicircular arch at the trailing end 46 of the kite as shown in FIG. 9. At the same time the leading end 55 of the kite forms a substantially semi-circular arch of larger area, see FIG. 8.

Various modifications may be made to the above-described kite.

For example, the rear tube 53 may be substantially straight when flat and/or may have an inverted-V shape cross-section when inflated. The kite 50 may incorporate one or more of the features of kite 150 and the described modifications thereto. Also, The kite 50 may be inflated and released in any desired manner, manually by a device 20 or otherwise.

We claim:

1. A kite having side edges, a front end and a rear end, the kite comprising: a transverse inflatable tube which, when inflated, defines a rear cross-sectional area of the kite; and a plurality of longitudinal tubes having front ends and rear ends, the rear ends of the plurality of longitudinal tubes being provided at the transverse inflatable tube, the longitudinal tubes, when inflated, provide a front opening at the front end of the kite which has a larger air flow cross-sectional area than an air flow cross-sectional area towards the rear of the kite, where, when inflated, the kite comprises at least one structure having (a) the front end-of the kite not co-planar with the side edges and rear and of the kite, and the rear end of the kite and side edges of the kite forming a substantially coplanar base of said kite, or (b) the rear end of the kite forming a generally semi-circular opening and the front end of the kite forming a larger generally semi-circular opening.

2. An emergency location kit comprising: a kite having side edges, a front end, a rear end, a transverse inflatable tube which, when inflated, defines a rear cross-sectional area of the kite, and a plurality of longitudinal tubes having front ends and rear ends, the rear ends of the plurality of longitudinal tubes being provided at the transverse inflatable tub, the longitudinal tubes, when inflated, provide a front opening at the front end of the kite, which has a larger air flow cross-sectional area than an air flow cross-sectional area towards the rear of the kite; a line; and a sealed pouch having a tear point or strip, the kite and line sealed in the pouch, wherein, when inflated, the kit comprises at least one structure having (a) the front end-of the kite not co-planar with the side edges and rear end of the kite, and the rear end of the kite and side-edges of the kite forming a substantially coplanar base of said kite, or (b) the rear end of the kite forming a generally semi-circular opening and the front end of the kite forming a larger generally semi-circular opening.

3. A new method of launching an inflatable kite, the kite having side edges, a front end, a rear end, a transverse inflatable tube which, when inflated, defines a rear cross-sectional area of the kite, and a plurality of longitudinal tubes having front ends and rear ends, the rear ends of the plurality of longitudinal tubes being provided at the transverse inflatable tube, the longitudinal tubes, when inflated, provide a front opening at the front end of the kite which has a larger air flow cross-sectional area than a air flow cross-sectional area towards the rear of the kite, comprising the step of: connection the kite to a source of inflation gas via a release devices wherein the, kite is automatically released when the correct pressure has been attained, and when inflated, the kite comprises at least one structure having (a) the front end of the kite not co-planar with the side edges and rear end of the kite, and the rear end of the kite and side edges of the kite forming a substantially coplanar base of said kite, or (b) the rear end of the kite forming a generally semi-circular opening and the front end of the kite forming a larger generally semicircular opening.

4. A kite having side edges, a front end and a rear end, the kite comprising: a transverse inflatable tube which, when inflated, defines a rear cross-sectional area of the kite; and a plurality of longitudinal tubes having front ends and rear ends, the rear ends of the plurality of longitudinal tubes being provided at the transverse inflatable tube, the longitudinal tubes, when inflated, provide a front opening at the front end of the kite which has a larger air flow cross-sectional area than an air flow cross-sectional area towards the rear of the kite, wherein, when inflated, the kite maintains a shape that enables the kite to be self-erecting and self-launching.

5. A kite according to claim 1 further comprising one or more air vents between the longitudinal tubes.

6. A kite according to claim 4 comprising an air vent (157) in front of the transverse tube (53).

7. An emergency location kit comprising: a kite having side edges, a front end, a rear end, a transverse inflatable tube which, when inflated, defines a rear cross-sectional area of the kite, and 2 plurality of longitudinal tubes having front ends and rear ends, the rear ends of the plurality of longitudinal tubes being provided at the transverse inflatable tub, the longitudinal tubes, when inflated, provide a front opening at the front end of the kite, which has a larger air flow cross-sectional area than an air flow cross-sectional area towards the rear of the kite; a line; and a sealed pouch having a tear point or strip, the kite and line sealed in the pouch, wherein, when inflated, the kite maintains a shape that enables the kite to be self-erecting and self-launching.

8. A method of launching an inflatable kite, the kite having side edges, a front end, a rear end, a transverse inflatable tube which, when inflated, defines a rear cross-sectional area of the kite, and a plurality of longitudinal tubes having front ends and rear ends, the rear ends of the plurality of longitudinal tubes being provided at the transverse inflatable tube, the longitudinal tubes, when inflated, provide a front opening at the front end of the kite which has a larger air flow cross-sectional area than an air flow cross-sectional area towards the rear of the kite, comprising the step(s) of connecting the kits to a source of inflation gas via a release device, and thereby automatically releasing the kite when the correct pressure has been attained, and when inflated, the kite maintains a shape that enables the kite to be self-erecting and self-launching.

9. A device for inflating and releasing an inflatable kite, the kite having a front end, a rear end, a transverse inflatable tube which, when inflated, defines a rear cross-sectional area of the kite, and a plurality of longitudinal tubes having front ends and rear ends, the rear ends of the plurality of longitudinal tubes being provided at the transverse inflatable tube, the longitudinal tubes, when inflated, provide a front opening at the front end of the kite which has a larger air flow cross-sectional area than an air flow cross-sectional area towards the rear of the kite, the device comprising:

a container having an inlet and an outlet for an inflation gas;

a piston member which can slide within the container under the effect of incoming gas; and engagement means on said piston member, which is arranged to hold the inflatable kite in communication with the outlet, the arrangement being such that the engagement means is disengaged from the inflatable kite when the piston member has been caused to slide a predetermined distance within the container.

\* \* \* \* \*